(12) United States Patent
Kobayashi et al.

(10) Patent No.: US 11,987,068 B2
(45) Date of Patent: May 21, 2024

(54) MARKING PEN

(71) Applicant: MITSUBISHI PENCIL COMPANY, LIMITED, Shinagawa-ku (JP)

(72) Inventors: Yusuke Kobayashi, Shinagawa-ku (JP); Toru Nakajima, Shinagawa-ku (JP); Akiko Hirayama, Shinagawa-ku (JP); Koji Takada, Shinagawa-ku (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 0 days.

(21) Appl. No.: 17/759,387

(22) PCT Filed: Jan. 14, 2021

(86) PCT No.: PCT/JP2021/001085
§ 371 (c)(1),
(2) Date: Jul. 25, 2022

(87) PCT Pub. No.: WO2021/157314
PCT Pub. Date: Aug. 12, 2021

(65) Prior Publication Data
US 2023/0086315 A1 Mar. 23, 2023

(30) Foreign Application Priority Data

Feb. 6, 2020 (JP) .................. 2020-019066

(51) Int. Cl.
*B43K 24/08* (2006.01)
*B43K 8/02* (2006.01)
(Continued)

(52) U.S. Cl.
CPC ............. *B43K 24/08* (2013.01); *B43K 8/022* (2013.01); *B43K 8/026* (2013.01); *B43K 8/08* (2013.01);
(Continued)

(58) Field of Classification Search
CPC ........ B43K 24/08; B43K 8/022; B43K 8/026; B43K 8/08; B43K 8/24; B43K 25/02;
(Continued)

(56) References Cited

U.S. PATENT DOCUMENTS 3,477,792 A * 11/1969 Shore ........................ B43K 8/24
401/109
3,881,828 A * 5/1975 Jones ........................ B43K 8/02
401/199
(Continued)

FOREIGN PATENT DOCUMENTS

EP 3 009 493 A1 4/2016
JP 49-27332 A 3/1974
(Continued)

OTHER PUBLICATIONS

International Search Report dated Apr. 13, 2021 in PCT/JP2021/001085, filed on Jan. 14, 2021, 2 pages.
(Continued)

*Primary Examiner* — David J Walczak
(74) *Attorney, Agent, or Firm* — Oblon, McClelland, Maier & Neustadt, L.L.P.

(57) ABSTRACT

A marking pen, comprising: a shaft cylinder; a porous pen core accommodated in the shaft cylinder, and configured to project from, and retract into, an opening part provided at a tip end of the shaft cylinder; an inner cotton accommodated in the shaft cylinder, and filled with an aqueous ink composition to be fed to the pen core, the aqueous ink composition including a water soluble organic solvent in an amount of from 20 mass % to 60 mass %; and a delivery mechanism configured to cause a tip end of the pen core to project from, and retract into, the opening part.

5 Claims, 3 Drawing Sheets

(51) Int. Cl.
 *B43K 8/08* (2006.01)
 *B43K 8/24* (2006.01)
 *B43K 25/02* (2006.01)
 *C09D 11/16* (2014.01)

(52) U.S. Cl.
 CPC ................ *B43K 8/24* (2013.01); *B43K 25/02* (2013.01); *C09D 11/16* (2013.01)

(58) Field of Classification Search
 CPC ...... B43K 24/02; B43K 24/04; B43K 24/084; B43K 24/086; B43K 8/06; C09D 11/16
 USPC .................................. 401/198, 199, 109–112
 See application file for complete search history.

(56) References Cited

U.S. PATENT DOCUMENTS 5,174,814 A * 12/1992 Burwell ................. B43K 8/003
 401/109

2006/0142418 A1 * 6/2006 Kawauchi .............. C09D 11/16
 523/161

FOREIGN PATENT DOCUMENTS

| JP | 2001-47786 A | 2/2001 |
| JP | 2012-077260 A | 4/2012 |
| JP | 2014-156605 A | 8/2014 |
| JP | 2016-55576 A | 4/2016 |
| JP | 2016-172343 A | 9/2016 |
| WO | WO 2019/189364 A1 | 10/2019 |

OTHER PUBLICATIONS

Office Action dated Dec. 12, 2023, in corresponding Japanese Patent Application No. 2020-019066 (with English Translation), 8 pages.
Extended European Search Report (EESR) issued on Feb. 14, 2024, in European Patent Application No. 21751384.5, 7 pages.

* cited by examiner

MARKING PEN

TECHNICAL FIELD

The present invention relates to a retractable marking pen.

BACKGROUND ART

Various types of writing instruments, such as marking pens including fluorescent marker pens, have been provided, which have an inner cotton that is accommodated in a shaft cylinder and is filled with an aqueous ink to be fed to a porous pen core by means of capillarity. Some of such marking pens are provided with a delivery mechanism that is formed so as to enable a tip end of the pen core to project from, and to retract into, an opening part at a tip end of the shaft cylinder, as disclosed in Japanese Patent Application Laid-Open (JP-A) Nos. 2016-172343 and 2016-55576.

SUMMARY OF INVENTION

Technical Problem

Since a retractable marking pen does not have a cap, the opening part remains open even in a state in which the tip end of the pen core has been retracted into the shaft cylinder. When a marking pen in this state is dropped with the tip end facing downward, owing to the low viscosity of an aqueous ink filled in the inner cotton, the impact upon landing will tend to cause the ink immersed in the pen core to splatter and dirty the interior of the shaft cylinder. Further, at such time, the tip end of the pen core will sometimes move toward and protrude from the opening part and mark what the tip end touches owing to the pen core moving counter to the action of the delivery mechanism at the tip end of the shaft cylinder of keeping the pen core retracted by urging the pen core rearward in the shaft cylinder (e.g., an action of urging the pen core rearward in the shaft cylinder by a restoring force of a pressed spring).

A marking pen, as disclosed in the aforementioned Patent Document 1 and Patent Document 2, is provided with a mechanism in which a member capable of opening and closing is provided in a vicinity of the opening part of the tip end of the shaft cylinder, with the mechanism closing the opening part in a state in which the tip end of the pen core is retracted into the shaft cylinder. However, if such an opening/closing mechanism is provided, not only is the number of parts of the marking pen increased, but further, when the tip is extended, the tip end of the pen core is projected out while the opening/closing mechanism is opened, and therefore, the distance of movement of the pen core (the so-called "click stroke") is lengthened. Accordingly, it is hoped that splattering of the ink and popping out of the tip end of the pen core from the opening part at the time of an impact due to dropping might be suppressed without the need for providing this kind of specialized opening/closing mechanism.

Solution to Problem

In view of the above-described problem, a marking pen of a first aspect of the present application comprises: a shaft cylinder; a porous pen core accommodated in the shaft cylinder, and configured to be able to project from and retract into an opening part provided at a tip end of the shaft cylinder; an inner cotton accommodated in the shaft cylinder, and filled with an aqueous ink composition to be fed to the pen core, the aqueous ink composition including a water soluble organic solvent in an amount of from 20 mass % to 60 mass %; and a delivery mechanism configured to cause a tip end of the pen core to project from and retract into the opening part.

In the present aspect, due to a water soluble organic solvent being included in an aqueous medium, the affinity between the aqueous ink composition and the inner cotton is increased. Due to the increase of the affinity between aqueous ink and the inner cotton, the force by which the inner cotton retains the aqueous ink composition increases, and this retaining force resists the impact of landing and prevents the aqueous ink composition from splattering.

In a marking pen of a second aspect of the present application, in addition to the structure of the first aspect, the aqueous ink composition contains urea in an amount from 1 mass % to 30 mass %. Due thereto, a film-like matter is formed at the tip end of the pen core and prevents dirtying due to the adhesion of ink that arises due to an unexpected contact between the tip end of the pen core, which projects out from the opening part due to the impact of landing, and a region where the tip end collides.

In a marking pen of a third aspect of the present application, in addition to the structure of the first or second aspect, in a state in which the tip end of the pen core has been retracted into the shaft cylinder, the tip end is positioned rearward from the opening part by 1 mm or more. Due thereto, it is unlikely for the tip end of the pen core to project out from the opening part at a time of landing.

In a marking pen of a fourth aspect of the present application, in addition to the structure of any one of the first through third aspects, the pen core is formed from a porous body covered by an outer skin. Accordingly, even if the tip end of the pen core projects out from the opening part due to the impact of landing, if the outer skin contacts the region that is collided with, it is unlikely to arise dirtying by the aqueous ink composition.

In a marking pen of a fifth aspect of the present application, in addition to the structure of any one of the first through fourth aspects, the shaft cylinder has a projection structure that projects outwardly, and the projection structure has a shape that is asymmetrical relative to an opposite side of the shaft cylinder, with respect to an axial center of the shaft cylinder. The projection structure here is, for example, a clip. By providing the projection structure that has a shape that is asymmetrical relative to the opposite side of the shaft cylinder across the axial center in this way, the probability that the tip end of the shaft cylinder will collide when landing is reduced. Due thereto, the possibility of splattering of the aqueous ink composition from the pen core and projection of the tip end of the pen core from the opening part is reduced.

Advantageous Effects of Invention

Because aspects of the present application are structured as described above, splattering of ink and projection of the tip end of the pen core from the opening part can be restrained, without a special structure such as a mechanism that opens and closes the opening part at the tip end of the shaft cylinder.

DESCRIPTION OF EMBODIMENTS

Figure 1A:
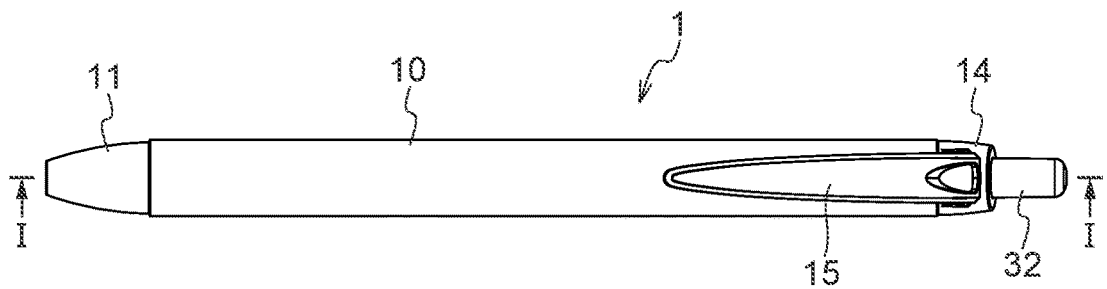
FIG. 1A is a front view of a marking pen of an embodiment of the present application, and illustrates a state in which a tip end of a pen core has been retracted.
Figure 1B:
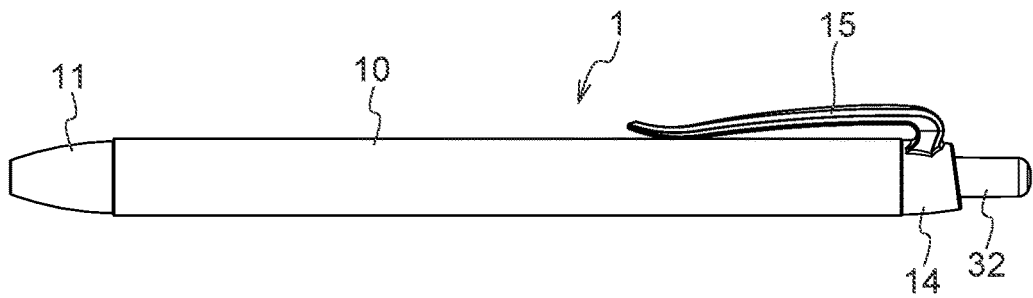
FIG. 1B illustrates the state of FIG. 1A in a side view.
Figure 1C:
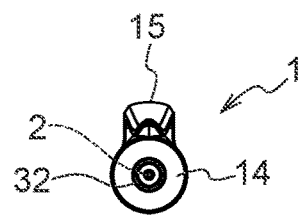
FIG. 1C illustrates the state of FIG. 1A in a plan view.

An embodiment of the present application is described hereinafter with reference to the drawings. In the following description, the side of a marking pen 1 at which side a writing tip end 43 is positioned is referred to as the tip end side, and the side opposite thereto is referred to as the rear end side. Further, the direction heading toward the tip end side is referred to as the frontward direction, and the direction opposite thereto is referred to as the rearward direction. Moreover, in cases in which identical reference numerals are used in different drawings, the identical reference numerals indicate identical structures even if the structures indicated by the reference numerals are not referenced per drawing.

FIG. 1A to FIG. 1D illustrate a state in which, at the marking pen 1 of the embodiment of the present application, the writing tip end 43 that is the tip end of a pen core 40 has been retracted. As illustrated in the front view of FIG. 1A and the side view of FIG. 1B, the marking pen 1 has, at the tip end side of a shaft cylinder 10 that is cylindrical tube shaped, a tip end reduced-diameter portion 11 whose outer diameter gradually decreases toward the front side, and has a tail end portion 14 that is attached to the rear end of the shaft cylinder 10, a clip 15 that projects out from a side surface of the tail end portion and extends forward, and a click button 32 that projects out from the tail end portion 14. The clip 15 is a projection structure that projects out toward the outer side at the shaft cylinder 10. An opening part 12 (see FIG. 1D) is formed at the tip end of the tip end reduced-diameter portion 11. Due to the clip 15 that serves as a projection structure being formed, as illustrated in the plan view of FIG. 1C, the marking pen 1 is a shape that is asymmetrical relative to the opposite side of the shaft cylinder 10 across axial center 2.

Figure 1D:
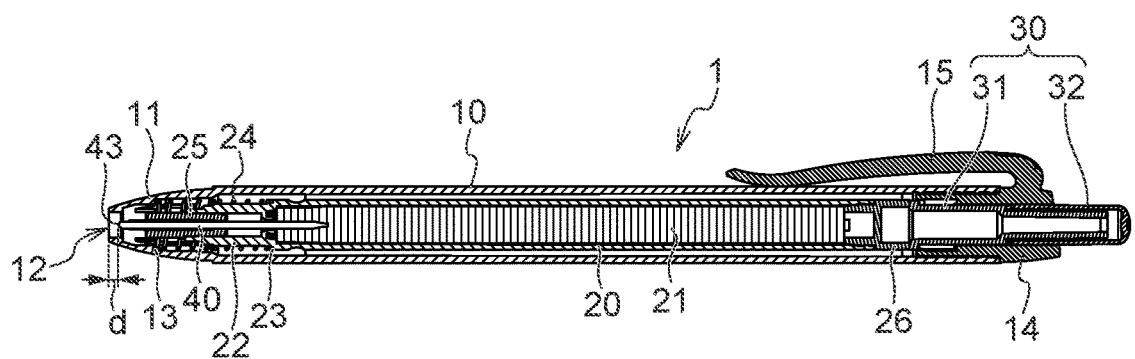
FIG. 1D illustrates the state of FIG. 1A in a I-I cross-sectional view.

As illustrated in FIG. 1D that is a I-I cross-sectional view of FIG. 1A, an ink accommodating tube 20, which is tubular and at whose tip end side the pen core 40 is mounted, is housed at the interior of the shaft cylinder 10 of the marking pen 1. Inner cotton 21 that is formed from polyester fibers is accommodated at the interior of the ink accommodating tube 20. An aqueous ink composition is charged in the inner cotton 21. The tip end side of the ink accommodating tube 20 is a pen core fixing portion 22 whose outer diameter is reduced. A pen core holder 25, which is shaped as a solid cylinder and through which the rod-shaped pen core 40 passes, is inserted in and fixed to the pen core fixing portion 22. The rear end of the pen core pierces the tip end of the inner cotton 21.

The aqueous ink composition includes a water soluble organic solvent in an amount of from 20 mass % to 60 mass %, and preferably from 25 mass % to 45 mass %. This water soluble organic solvent is not particularly limited provided that it is an organic solvent having a hydrophobic group and a hydrophilic group in the molecule structure, and an organic compound having two or more, and preferably two or three, hydroxy groups (—OH) within the molecule is preferable. Examples of such an organic compound are glycerin, diethylene glycol, triethylene glycol, propylene glycol, and ethylene glycol. Inclusion of such a water soluble organic solvent improves the affinity of the aqueous ink composition with respect to the inner cotton 21. Note that, if the content of the water soluble organic solvent in the water soluble ink composition is less than 20 mass %, the effect of improving the affinity of the water soluble ink composition with respect to the inner cotton 21 is not sufficiently obtained. On the other hand, even if the content of the water soluble organic solvent in the water soluble ink composition exceeds 60 mass %, the effect of improving the affinity of the water soluble ink composition with respect to the inner cotton 21 does not change, but there are cases in which the ability of the ink to flow out suffers owing to the increase of the viscosity of the aqueous ink composition.

Further, it is preferable that a film-like article be formed at the tip end of the pen core, and, in order to prevent dirtying due to the adhesion of ink, that urea be included in an amount of from 1 mass % to 30 mass %. Further, it is preferable for the aqueous ink composition to have the initial viscosity at shear rates of 1 to 383 $s^{-1}$ (25° C.) within the range of 2 to 15 mPa·sec, and the surface tension (25° C.) greater than or equal to 30 mN/m. Note that, if the content of urea in the water soluble ink composition is less than 1 mass %, the effects of forming a film-like article at the tip end of the pen core and preventing dirtying due to adhesion of the ink are not sufficiently obtained. On the other hand, even if the content of the urea in the water soluble ink composition exceeds 30 mass %, there is no change in the effects of forming a film-like article at the tip end of the pen core and preventing dirtying due to adhesion of the ink, but there are cases in which the solubility of the urea in the aqueous ink composition is insufficient.

A tail plug 26 that is substantially shaped as a cylindrical tube is press-fit into and fixed to the rear end side of the ink accommodating tube 20. The rear end side of the inner cotton 21 is compressed by this tail plug 26. The rear end of the tail plug 26 abuts the tip end of a rotator 31 that structures a so-called can-knock mechanism. Further, the outer diameter of the rear end of the rotator 31 is reduced, and the click button 32 is placed on this portion, and, as described above, projects out rearward from the tail end portion 14. A delivery mechanism 30 is formed by the rotator 31 and the click button 32. As will be described later, this delivery mechanism 30 causes the writing tip end 43 to project out from and retract into the opening part 12. On the other hand, a spring 24 that is placed on the pen core fixing portion 22 is interposed between a rear end supporting step 23, which is a step positioned at the rear end edge of the pen core fixing portion 22 of the ink accommodating tube 20, and a tip end supporting step 13, which is a step formed at the inner peripheral surface of the tip end reduced-diameter portion 11 of the shaft cylinder 10. This spring 24 always urges the ink accommodating tube 20 toward the rear in the shaft cylinder 10. It is preferable that the spring load of the spring 24 be 1 N or more. Due to the rearward urging of this spring 24, the writing tip end 43 of the pen core 40 is positioned at distance d illustrated in FIG. 1D, and specifically, rearward from the opening part 12 by 1 mm or more.

Figure 2A:
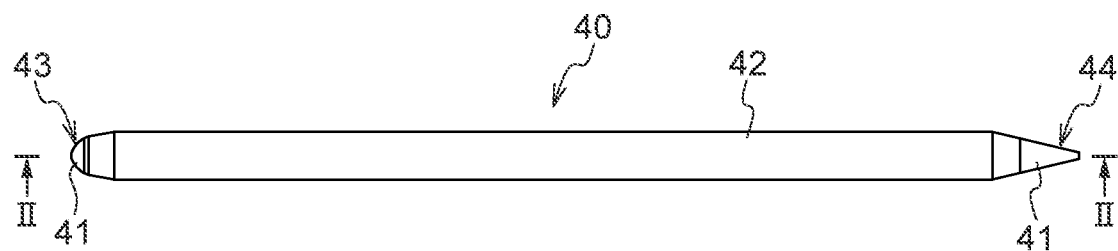
FIG. 2A is a front view of the pen core.
Figure 2B:
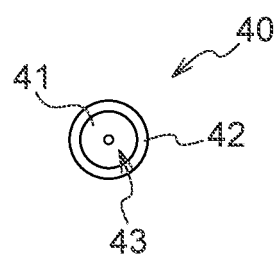
FIG. 2B is a bottom view of the pen core.
Figure 2C:
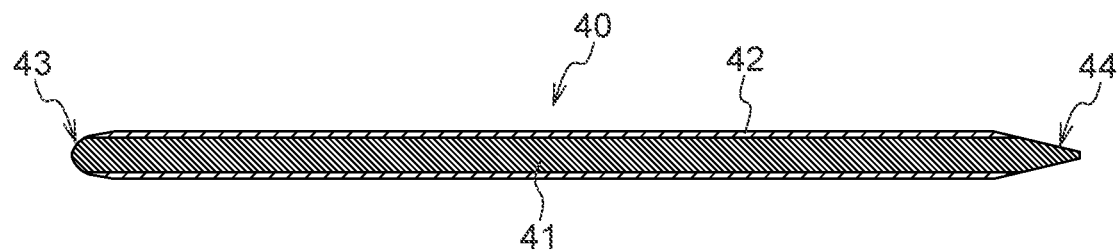
FIG. 2C is a II-II cross-sectional view of FIG. 2A.

As illustrated in the front view of FIG. 2A and the bottom view of FIG. 2B, the pen core 40 is formed in the shape of a rod having a circular cross-section. The tip end side of the pen core 40 is the writing tip end 43 that is formed in a substantially hemispherical shape. The rear end side of the pen core 40 is a piercing rear end 44 that is taper-shaped. This piercing rear end 44 is the portion that pierces the inner cotton 21 as illustrated in FIG. 1D. As illustrated in FIG. 2C, the pen core 40 has a structure in which a porous body 41, which is porous and is formed by polyester fibers being compacted, is covered by an outer skin 42 that is a thin film made of a polyethylene resin. The outer skin 42 is peeled off and the porous body 41 is exposed due to the writing tip end 43 and the piercing rear end 44 of the pen core 40 being cut into their respective shapes. Due to the pen core 40 piercing the inner cotton 21, the aqueous ink composition filled in the inner cotton 21 is supplied from the piercing rear end 44 to the writing tip end 43 by the capillarity of the porous body 41, and writing is possible.

Figure 3A:
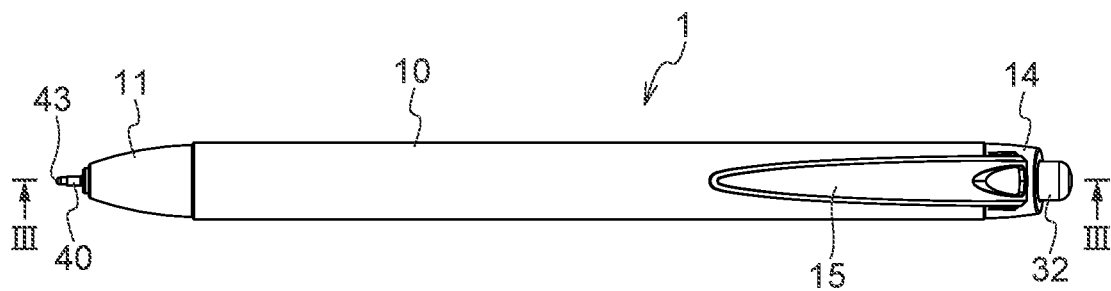
FIG. 3A illustrates, in a front view, a state in which the tip end of the pen core projects out from the state of FIG. 1A.
Figure 3B:
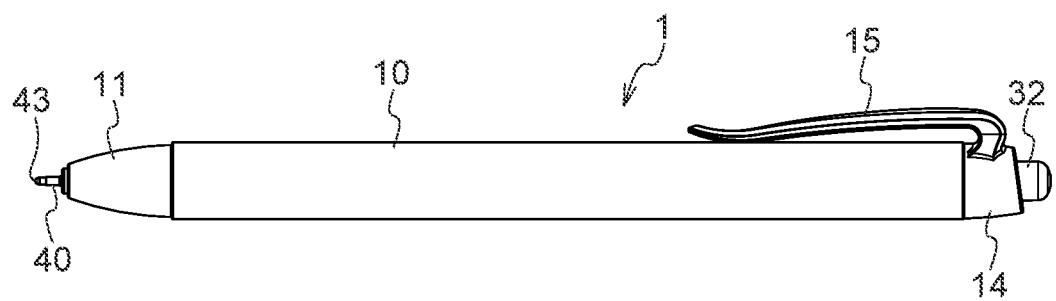
FIG. 3B illustrates the state of FIG. 3A in a side view.
Figure 3C:
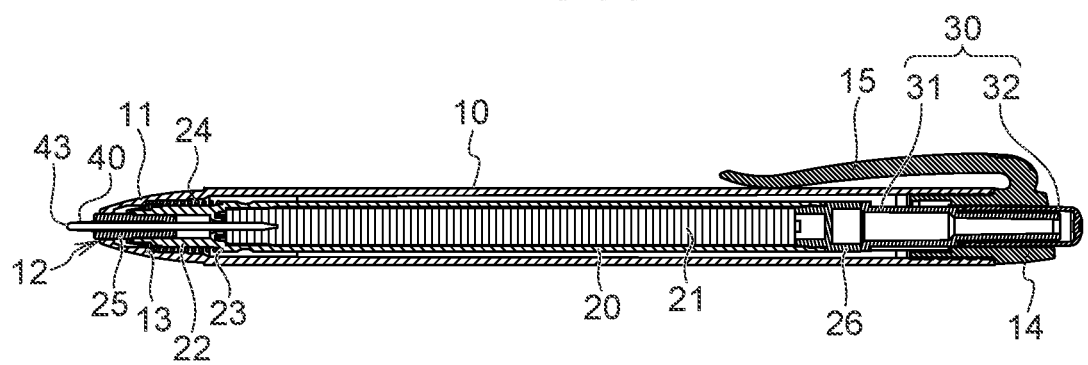
FIG. 3C illustrates the state of FIG. 3A in a III-III cross-sectional view.

Here, an unillustrated cam groove is formed in the inner peripheral surface of the rear end side of the shaft cylinder 10. Due to the click button 32 that serves as the delivery mechanism 30 being pushed forward as illustrated in FIG. 3A to FIG. 3C, an unillustrated cam projection formed at the outer peripheral surface of the rotator 31 slides along the cam groove of the shaft cylinder and compresses the spring 24, and the ink accommodating tube 20 moves forward. Due thereto, the writing tip end 43 of the pen core 40 projects out from the opening part 12 of the shaft cylinder 10. At this time, the rotator 31 engages with the cam groove, and this projected state is maintained. In this projected state, writing by the marking pen 1 is possible.

When, from the projected state of the writing tip end 43 illustrated in FIG. 3A to FIG. 3C, the click button 32 is pushed again, the engagement of the rotator 31 and the cam groove is cancelled, and the ink accommodating tube 20 moves rearward due to the restoring force of the spring 24, and the writing tip end 43 is again returned to the retracted state illustrated in FIG. 1A to FIG. 1D. In this way, the writing tip end 43 can be projected from and retracted into the opening part by the delivery mechanism 30.

At the marking pen 1 of the present embodiment, it is preferable that the mass of the shaft cylinder 10 including the tail end portion 14 (including the clip 15) and the delivery mechanism 30 is 15 g or less, and that the mass of the ink accommodating tube 20 including the pen core 40 is 10 g or less.

Since the marking pen 1 of the present embodiment is structured as described above, in a case in which the marking pen 1, which is in the state in which the writing tip end 43 has been retracted that is illustrated in FIG. 1A to FIG. 1D, is dropped with the tip end facing downward, even if the tip end collides with a horizontal surface such as the top of a desk or the floor, the writing tip end 43 contacting the region that is collided with against the spring load of the spring 24, and further, the aqueous ink composition that has seeped into the pen core 40 splattering onto the region that is collided with, are prevented. Further, the shaft cylinder has an asymmetrical shape due to the clip 15 that serves as the projection structure being provided at the shaft cylinder 10, and, due thereto, the probability of the marking pen 1 landing upon a horizontal surface from the tip end thereof when the marking pen 1 is dropped is reduced.

EXAMPLES (1) Aqueous Ink Composition

Aqueous ink compositions of respective Examples and Comparative Examples are the following compositions. Note that MA100 (Mitsubishi Chemical) was used as a black pigment, CHROMOFINE BLUE A-220JC (Dainichiseika Color & Chemicals) was used as a blue pigment, Joncryl 63J (BASF) was used as a pigment dispersing agent, Bioden S (Daiwa Chemical Industries) was used as a preservative, and Capstone FS-10 (Dupont) was used as a fluorine surfactant, respectively.

(1-1) Example 1 black pigment: 5.5 mass %
pigment dispersing agent: 4.0 mass %
glycerin (water soluble organic solvent): 10.0 mass %
ethylene glycol (water soluble organic solvent): 10.0 mass %
diethylene glycol (water soluble organic solvent): 10.0 mass %
(total water soluble organic solvents): 30.0 mass %
preservative: 0.4 mass %
urea: 10.0 mass %
trimethylglycine: 5.0 mass %
trehalose: 2.0 mass %
trimethylolpropane: 1.0 mass %
trimethylolethane: 0.5 mass %
ion exchanged water: 41.6 mass %

Due to the above composition, the initial viscosity of the aqueous ink composition of Example 1 was 6.4 mPa·sec, and the surface tension was 56.0 mN/m.

(1-2) Example 2 blue pigment: 4.5 mass %
pigment dispersing agent: 3.6 mass %
glycerin (water soluble organic solvent): 15.0 mass %
diethylene glycol (water soluble organic solvent): 10.0 mass %
(total water soluble organic solvents): 25.0 mass %
preservative: 0.4 mass %
urea: 20.0 mass %
trimethylglycine: 3.0 mass %
pentaerythritol: 2.0 mass %
trimethylolpropane: 2.0 mass %
ion exchanged water: 39.5 mass %

Due to the above composition, the initial viscosity of the aqueous ink composition of Example 2 was 5.8 mPa·sec, and the surface tension was 55.0 mN/m.

(1-3) Example 3 black pigment: 5.5 mass %
pigment dispersing agent: 4.0 mass %
glycerin (water soluble organic solvent): 10.0 mass %
ethylene glycol (water soluble organic solvent): 10.0 mass %
diethylene glycol (water soluble organic solvent): 10.0 mass %
(total water soluble organic solvents): 30.0 mass %
preservative: 0.4 mass %
urea: 1.0 mass %
trimethylglycine: 5.0 mass %
trehalose: 2.0 mass %
trimethylolpropane: 1.0 mass %
trimethylolethane: 0.5 mass %
ion exchanged water: 50.6 mass %

Due to the above composition, the initial viscosity of the aqueous ink composition of Example 3 was 5.9 mPa·sec, and the surface tension was 56.0 mN/m.

(1-4) Example 4 black pigment: 5.5 mass %
pigment dispersing agent: 4.0 mass % glycerin (water soluble organic solvent): 10.0 mass %
diethylene glycol (water soluble organic solvent): 10.0 mass %
(total water soluble organic solvents): 20.0 mass %
preservative: 0.4 mass %
urea: 20.0 mass %
trimethylglycine: 3.0 mass %
trehalose: 3.0 mass %
trimethylolpropane: 1.0 mass %
trimethylolethane: 1.0 mass %
ion exchanged water: 42.1 mass %
Due to the above composition, the initial viscosity of the aqueous ink composition of Example 4 was 5.3 mPa·sec, and the surface tension was 57.0 mN/m.

(1-5) Comparative Example 1 black pigment: 5.5 mass %
pigment dispersing agent: 4.0 mass %
ethylene glycol (water soluble organic solvent): 18.0 mass %
(total water soluble organic solvents): 18.0 mass %
preservative: 0.4 mass %
urea: 10.0 mass %
trimethylglycine: 5.0 mass %
trehalose: 2.0 mass %
trimethylolpropane: 1.0 mass %
trimethylolethane: 0.5 mass %
fluorine surfactant: 0.2 mass %
ion exchanged water: 53.4 mass %
Due to the above composition, the initial viscosity of the aqueous ink composition of Comparative Example 1 was 3.9 mPa·sec, and the surface tension was 29.5 mN/m.

(1-6) Comparative Example 2 blue pigment: 4.5 mass %
pigment dispersing agent: 3.6 mass %
glycerin (water soluble organic solvent): 6.0 mass %
ethylene glycol (water soluble organic solvent): 6.0 mass %
diethylene glycol (water soluble organic solvent): 6.0 mass %
(total water soluble organic solvents): 18.0 mass %
preservative: 0.4 mass %
urea: 0.5 mass %
trimethylglycine: 1.0 mass %
trehalose: 1.0 mass %
trimethylolpropane: 0.5 mass %
trimethylolethane: 0.5 mass %
ion exchanged water: 70.0 mass %
Due to the above composition, the initial viscosity of the aqueous ink composition of Comparative Example 2 was 2.5 mPa·sec, and the surface tension was 58.2 mN/m.

(2) Marking Pen 1

One ml of the aqueous ink composition of the above-described Examples and Comparative Examples was charged into the inner cotton 21 of the marking pen 1 of the above-described embodiment, respectively. Note that the mass of the shaft cylinder 10 including the tail end portion 14 (including the clip 15) and the delivery mechanism 30 was 4.8 g, the mass of the ink accommodating tube 20 including the pen core 40 and the inner cotton 21 in which the aqueous ink composition was filled was 3.0 g, and the total mass of marking pen 1 was 7.8 g. Further, the spring load of the spring 24 was 2.0 N. Moreover, in the retracted state of the writing tip end 43 illustrated in FIG. 1A to FIG. 1D, the writing tip end 43 was positioned 1.4 mm rearward of the opening part 12.

(3) Test Method

The marking pen 1 of (2) was, in a state in which the writing tip end 43 had been retracted, freely dropped from 30 cm above a concrete horizontal surface with the tip end facing downward, and collided from the tip end.

(4) Evaluation (1): Ink Splattering

At the interior of the shaft cylinder 10 of the marking pen 1 that had collided with the concrete horizontal surface in (3), dirtying by the aqueous ink composition that had splattered was observed. The evaluation standards were following A to C, in that order from an excellent evaluation.
A: No dirtying was noted.
B: A slight amount of dirtying was noted.
C: Dirtying was conspicuous.

(5) Evaluation (2): Dirtying of Collided Surface

At the concrete horizontal surface with which the (3) marking pen 1 collided, dirtying by the aqueous ink composition was observed. The evaluation standards were following A to C, in that order from an excellent evaluation.
A: No dirtying was noted, or only a very slight amount of dirtying was noted.
B: Some dirtying was noted.
C: Dirtying was conspicuous.

(6) Test Results

The test results of (3) for the aqueous ink compositions of the respective Examples and Comparative Examples are as put forth in following Table 1.

TABLE 1

| Example/Comparative Example | Evaluation 1 | Evaluation 2 |
|---|---|---|
| Example 1 | A | A |
| Example 2 | A | A |
| Example 3 | A | B |
| Example 4 | B | A |
| Comparative Example 1 | C | B |
| Comparative Example 2 | C | C |

As shown in above Table 1, Comparative Example 1 and Comparative Example 2 in which the content of the water soluble organic solvents in the aqueous ink composition was less than 20 mass % had poor evaluations in both Evaluation 1 and Evaluation 2. In particular, it is thought that the surface tension of Comparative Example 1 being 29.5 mN/m, which was the only one less than 30 mN/m, was a cause of the poor evaluation. On the other hand, all of the respective Examples in which the content of the water soluble organic solvents in the aqueous ink composition was from 20 mass % to 60 mass % were evaluated highly.

From the above results, it can be concluded that splattering of the ink and dirtying of the surface that is dropped upon can be prevented by, in addition to the mechanism of the marking pen 1 described in the embodiment, having the content of water soluble organic solvents in the aqueous ink composition be from 20 mass % to 60 mass %.

Note that, with regard to the splattering of ink of Example 4 in which the content of water soluble organic solvents in the aqueous ink composition was 20 mass % which is the lower limit value, the slightly inferior evaluation (B) was obtained. Due thereto, the critical significance of the lower limit value of the numerical range, which is that the content of water soluble organic solvent in the aqueous ink composition is 20 mass % or more, is inferred. Note that, in Example 3, it is thought that the urea content being 1.0 mass %, which was the lowest among the Examples, was a cause of the evaluation thereof being slightly lower than those of Example 1 and Example 2.

INDUSTRIAL APPLICABILITY

The present invention can be applied to marking pens having a delivery mechanism such as a knock mechanism.

The invention claimed is:

1. A marking pen, comprising:
   a shaft cylinder;
   a porous pen core accommodated in the shaft cylinder, and configured to project from, and retract into, an opening part provided at a tip end of the shaft cylinder;
   an inner cotton accommodated in the shaft cylinder, and filled with an aqueous ink composition to be fed to the pen core, the aqueous ink composition including a water soluble organic solvent in an amount of from 20 mass % to 60 mass %, a pigment, and a pigment dispersing agent; and
   a delivery mechanism configured to cause a tip end of the pen core to project from, and retract into, the opening part.

2. The marking pen of claim 1, wherein the aqueous ink composition includes urea in an amount of from 1 mass % to 30 mass %.

3. The marking pen of claim 1, wherein, in a state in which the tip end of the pen core has been retracted into the shaft cylinder, the tip end is positioned rearward from the opening part by 1 mm or more.

4. The marking pen of claim 1, wherein the pen core is formed from a porous body covered by an outer skin.

5. The marking pen of claim 1, wherein:
   the shaft cylinder has a projection structure that projects outwardly, and
   the projection structure has a shape that is asymmetrical relative to an opposite side of the shaft cylinder, with respect to an axial center of the shaft cylinder.

* * * * *